(12) United States Patent
Kemeny et al.

(10) Patent No.: US 9,841,322 B1
(45) Date of Patent: Dec. 12, 2017

(54) SPECTRAL IMAGING WITH MULTIPLE ILLUMINATION SOURCES

(71) Applicant: Kemeny Associates LLC, Midldeton, WI (US)

(72) Inventors: Gabor John Kemeny, Verona, WI (US); Gard Anders Groth, Madison, WI (US); Christopher Erwin Zueger, Chicago, IL (US); Xu Zhai, Madison, WI (US); Gina Elaine Stuessy, Middleton, WI (US); Natalie Ann Crothers, Wisconsin Dells, WI (US); Howland Jones, Rio Rancho, NM (US)

(73) Assignee: Kemeny Associates LLC, Middleton, WI (US)

( * ) Notice: Subject to any disclaimer, the term of this patent is extended or adjusted under 35 U.S.C. 154(b) by 241 days.

(21) Appl. No.: 14/728,530

(22) Filed: Jun. 2, 2015

Related U.S. Application Data (60) Provisional application No. 62/006,480, filed on Jun. 2, 2014.

(51) Int. Cl.
 *G01J 3/10* (2006.01)
 *G01J 3/02* (2006.01)
 *H04N 5/225* (2006.01)
 *H04N 5/232* (2006.01)

(52) U.S. Cl.
 CPC ............ *G01J 3/108* (2013.01); *G01J 3/0218* (2013.01); *G01J 3/0229* (2013.01); *G01J 3/0254* (2013.01); *G01J 3/0272* (2013.01); *H04N 5/2256* (2013.01); *H04N 5/23241* (2013.01); *G01J 2003/104* (2013.01)

(58) Field of Classification Search
 CPC ........ G01J 3/108; G01J 3/0218; G01J 3/0229; G01J 3/0254; H04N 5/2256; H04N 5/23241
 See application file for complete search history.

(56) References Cited

U.S. PATENT DOCUMENTS

| | | | |
|---|---|---|---|
| 4,932,779 A | * | 6/1990 | Keane .................... G01J 3/0251 250/228 |
| 7,359,060 B2 | | 4/2008 | Ebersole et al. |
| 7,471,390 B2 | | 12/2008 | Deck et al. |
| 7,605,918 B2 | | 10/2009 | Dalrymple |
| 7,698,098 B2 | | 4/2010 | Ritter et al. |

(Continued)

*Primary Examiner* — Behrooz Senfi
(74) *Attorney, Agent, or Firm* — Craig A. Fieschko, Esq.; DeWitt Ross & Stevens S.C.

(57) ABSTRACT

A spectrometric device for optical analysis of material composition, coating thickness, surface porosity, and/or other characteristics uses several monochromatic light sources—e.g., laser diodes—to illuminate a sample, with a camera taking an image of the sample under each source's light, and with the various images then being combined to generate a (hyper)spectral image. To address the difficulty in obtaining uniform illumination intensity across the illuminated sample area with solid-state light sources, the output from the light sources may be supplied to an integrating sphere (preferably after being combined within a fiber combiner), and then to a fiber bundle whose output ends are configured as a ring light (a ring of fiber ends directing light at a common spot). The camera may then focus on the spot, at which the sample may be placed for illumination and imaging.

20 Claims, 6 Drawing Sheets

(56) References Cited

U.S. PATENT DOCUMENTS

| | | | |
|---|---|---|---|
| 8,140,500 B2 | 3/2012 | Workman et al. | |
| 8,295,578 B2 | 10/2012 | Lundgren et al. | |
| 8,338,787 B1 | 12/2012 | Shelley et al. | |
| 8,368,880 B2 | 2/2013 | Treado et al. | |
| 8,406,859 B2 | 3/2013 | Zuzak et al. | |
| 8,655,433 B2 | 2/2014 | Freeman et al. | |
| 8,853,634 B2 | 10/2014 | Shelley, Jr. et al. | |
| 2003/0058441 A1* | 3/2003 | Shakespeare | G01J 3/28 356/319 |
| 2005/0105791 A1* | 5/2005 | Lee | G01N 21/47 382/145 |
| 2011/0206254 A1* | 8/2011 | Patwardhan | A61B 5/0077 382/128 |
| 2016/0100854 A1* | 4/2016 | Hyde | A61B 17/32002 600/309 |
| 2016/0309065 A1* | 10/2016 | Karafin | G02B 6/32 |
| 2017/0010153 A1* | 1/2017 | Vezard | G01J 3/0291 |

\* cited by examiner

SPECTRAL IMAGING WITH MULTIPLE ILLUMINATION SOURCES

CROSS-REFERENCE TO RELATED APPLICATIONS

This application claims priority under 35 USC §119(e) to U.S. Provisional Patent Application 62/006,480 filed Jun. 2, 2014, the entirety of which is incorporated by reference herein.

FIELD OF THE INVENTION

This document concerns an invention relating generally to molecular spectroscopy, and more specifically to non-contact optical analysis wherein a sample is imaged using several different discrete-wavelength light sources, in particular, laser sources.

BACKGROUND OF THE INVENTION

Molecular spectrometers are sometimes used to analyze the composition of materials. Such spectrometers emit light having known wavelength(s) and intensity onto the material to be analyzed, and then capturing the light scattered from (and/or transmitted through) the material, with the difference between the emitted and measured light providing information regarding the characteristics of the material. For example, near-infrared spectrometers direct different near-infrared wavelengths of light onto a material, either simultaneously or sequentially, and detect the intensity of the reflected or transmitted light at each wavelength. (Other wavelength ranges are possible, with ultraviolet, visible, or mid-infrared ranges—or some combination of ranges between 200 nm to 25,000 nm—being common.) The resulting spectrum returned by the material—that is, the intensity at each measured wavelength—can provide information regarding the composition of the material (or regarding other material characteristics, such as thickness, porosity, prior heat treatment, etc.) at the illuminated area. Further details can be found in, for example, Davies, A. M. C. et al: Near Infrared Spectroscopy: The Future Waves, NIR Publications (1996); and in Burns, D. A, et al: Handbook of Near-Infrared Analysis, Practical Spectroscopy Series, Marcel Dekker, Inc. (1992).

The spectrum returned by the illuminated area effectively represents the average material composition over the illuminated area; for example, if the illuminated area on a composite material has both fibers and polymeric material, the spectrum for this area will effectively be a combination of the spectrum for the fiber alone, plus the spectrum for the polymeric material alone. It is often more useful to know the spatial distribution of materials across a sample, rather than just measuring the "bulk" composition of the sample. Thus, a method known as spectral imaging—or hyperspectral imaging if a large number of wavelengths is analyzed—obtains spectra at sub-areas or "pixels" across the surface of the sample, where each pixel contains its own distinct spectral information. This (hyper)spectral imaging can be performed, for example, by uniformly illuminating a sample area with a sequence of wavelengths, and detecting the distribution of the composition at each pixel on the area using a camera sensitive in the wavelength range of the illumination.

(Hyper)spectral imaging devices require uniform and reproducible illumination across the sample area to be analyzed. Direct illumination using incandescent lamps is commonly used for cost-effectiveness, with quartz halogen lamps being popular owing to the wide wavelength range of quartz halogen sources. However, illumination from an incandescent lamp is nonuniform due to the structure of the lamp's filaments and bulb/enclosure, and due to any reflectors used to direct the light as needed. The use of multiple lamps introduces further nonuniformity in the distribution of light intensity and color due to the differences between the individual lamps, and due to the geometry of their relative placement.

Solid-state light sources such as LEDs and lasers are powerful light sources which produce a fraction of the heat of incandescent sources, and which typically have lifetimes extending to tens of thousands of hours. However, they are typically monochromatic sources—they emit in only a single wavelength, or in a narrow band—and typically a wider range of wavelengths is desired for spectral illumination. Thus, considerations for selecting and using solid-state sources are the availability and cost of the light sources capable of providing the desired wavelengths, and how to efficiently couple their light output to the sample area in a uniform manner. For example, a common method of seeking uniform output illumination from multiple input sources—whether solid-state or incandescent—is to couple the sources to fiber optics wherein the fibers are randomized from their input ends to their output ends. The large number of fibers and their random arrangement homogenizes the light, and provides a relatively uniform light spot at a distance from the output end. Such devices are commercially available from optical catalog companies, such as Edmund Optics (Barrington, N.J.). Each input end in these devices is usually a round fiber bundle, and the output end has fibers arranged in a round or linear pattern. This method works acceptably well for incandescent lamps, but for highly directed light sources such as lasers, the light coupling into the fiber is insufficiently uniform, and there is often a distinct laser speckle pattern on the sample being illuminated. Additionally, because the randomization of the fiber bundle is usually imperfect, there can be variations in intensity across the output side. A variation of this method uses a fiber bundle with one or more round input sides, and an output side wherein the fiber ends are arrayed in a ring-like configuration, with the fiber ends being oriented such that light output therefrom is oriented towards a common location. Here too illumination tends to be nonuniform at the output ends when highly directional light sources, such as LEDs and lasers, are used. Spatial uniformity of illumination is critical to the quality of spectral measurements, and each input wavelength needs to be projected on the area of interest with uniform intensity across the area.

Integrating spheres have previously been used to detect multi-directional reflection off of diffuse surfaces, as well as for measuring the absolute intensity of light-emitting devices. Companies such as Labsphere, Inc. (North Sutton, N.H.) produce differently-sized integrating spheres made from, or having their inner surfaces coated with, highly reflective materials. Input and output ports on the sphere provide input and output of light with a good degree of directional homogenization of the light due to the multiple reflections occurring inside the sphere. Integrating spheres have previously been used in near-infrared analyzers, such as the InfraAlyzer IA 450 (Bran and Luebbe, Norderstedt, Germany). Highly uniform illumination of the sample was achieved only if the sample was in contact with the output port of the integrating sphere; non-contact arrangements result in unsuitably nonuniform illumination. A small space between the illuminating device and the sample can be achieved by a half integrating sphere, such as the Hemilite™ Vision Illuminator (StockerYale, Inc., Salem, N.H.). This device has built-in LEDs and improves uniformity of illumination, but is not applicable to highly directional illumination, such as that provided by multiple lasers, because the light does not undergo the many multiple reflections that it experiences in complete integrating spheres.

SUMMARY OF THE INVENTION

The invention, which is defined by the claims set forth at the end of this document, is directed to devices and methods which seek to provide greater illumination uniformity on a sample area from several different solid-state directional light sources (e.g., lasers and LEDs) for the purposes of (hyper)spectral imaging. A basic understanding of some of the features of exemplary versions of the invention can be attained from a review of the following brief summary of preferred versions of the invention, with more details on these and other versions being provided elsewhere in this document. To assist in the reader's understanding, the following review makes reference to the accompanying drawings (which are briefly reviewed in the "Brief Description of the Drawings" section following this Summary section of this document).

Figure 1:
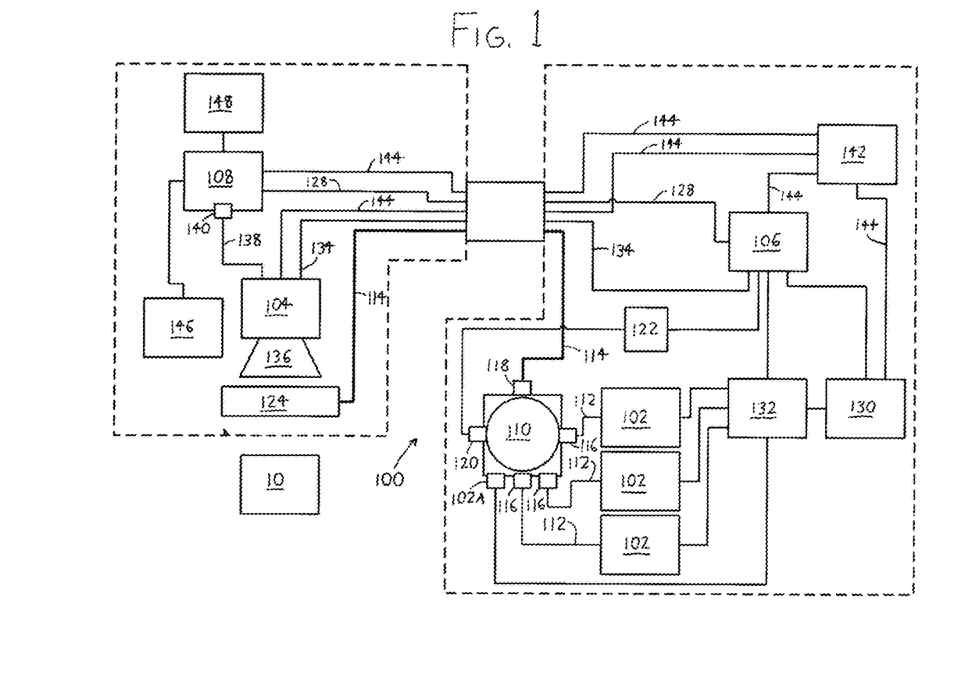
FIG. 1 is a schematic diagram illustrating components of the exemplary spectrometric device 100.

FIG. 1 provides a schematic view of a spectrometric device 100 for analyzing the composition of a sample 10 by capturing spectra from an area on the sample 10. The device 100 includes two or more monochromatic light sources 102, such as LEDs or diode lasers, for illuminating the sample area 10; a camera 104 configured to capture a two-dimensional image of the sample area 10; a control system 106/108 configured (at 106) to activate the light sources 102 to emit light (preferably by sequentially activating the light sources), and to activate the camera 104 (at 108) to capture two-dimensional images of the sample area 10 (at least at times when the light sources are activated); and a light transmission assembly which transmits the light from the light sources to the sample 10 (and homogenizes the light as it does so), with the light transmission assembly in FIG. 1 including an integrating sphere 110, a source optical transmitter 112 for transmitting light from the light sources to the integrating sphere (with the source optical transmitter 112 in FIG. 1 being provided by source optical fibers), and an output optical transmitter 114 for transmitting light from the integrating sphere to the sample 10 (with the output optical transmitter 114 in FIG. 1 being provided by an output optical fiber bundle).

FIG. 1's source optical transmitter 112—the source optical fibers—have input ends optically coupled to the light sources 102 (i.e., affixed in relation to the light sources 102 in such a manner that they receive light from the light sources 102), and output ends optically coupled to sphere input ports 116 on the integrating sphere 110. Preferably, each source optical fiber 112 is in fact an optical fiber bundle, with the fibers in each bundle being randomized between their input and output ends. More preferably, the source optical transmitter is a fiber combiner 200 (FIG. 2) having two or more combiner input ends 202, each being optically coupled to one of the light sources, and a single combiner output end 204 optically coupled to one of the sphere input ports 116.

Apart from the one or more sphere input ports 116 which receive light from the light sources 102, the integrating sphere 110 of FIG. 1 has one or more output ports 118. These include at least one "standard" sphere output port 118 optically coupled to the output optical transmitter (the output optical fiber bundle 114 of FIG. 1) for transmitting integrated light from the integrating sphere 110 to the sample 10, and optionally a sphere reference port 120 optically coupled to a reference detector 122. The reference detector 122 is configured to measure the light intensity within the integrating sphere 110, and thereby provide a reference intensity measurement for any light sources 102 emitting into the integrating sphere 110 at the time the reference measurement is made, which can be useful where light sources 102 may have intensity which varies over time.

Figure 3A:
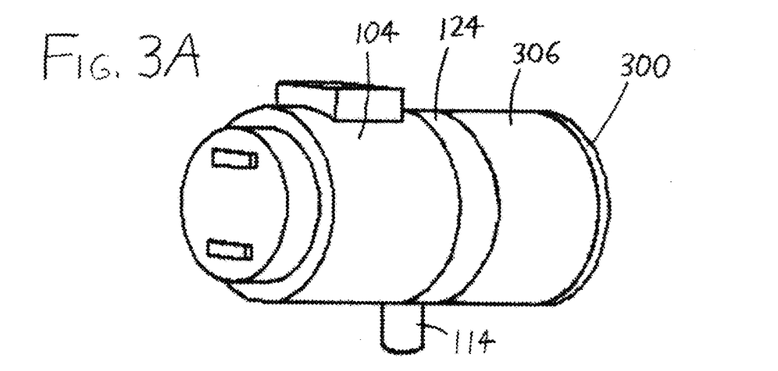
FIGS. 3A and 3B are respectively assembled and exploded (disassembled) perspective views of an exemplary spectrometric measurement head for use in the device 100, with sample illuminator (ring light) 124 and imaging camera 104.
Figure 3B:
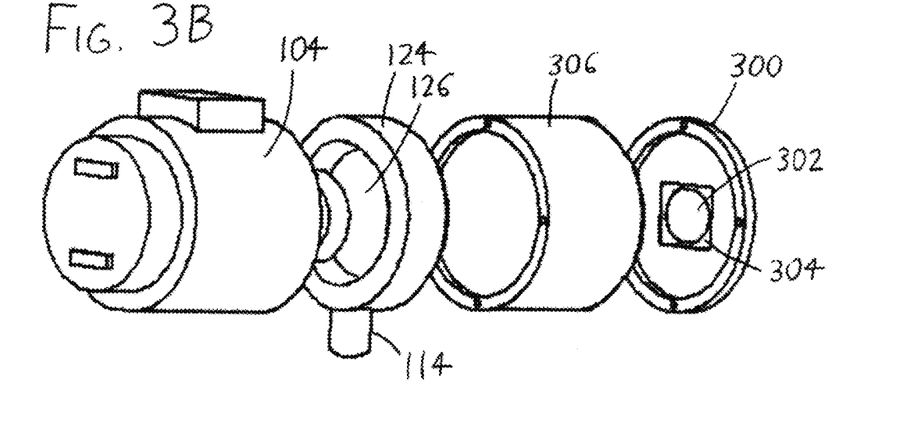

The output optical fiber bundle 114 of the output optical transmitter of FIG. 1 has its fiber input ends optically coupled to the sphere output port 118, and its opposing fiber output ends, which may directly illuminate the sample 10, are preferably randomized for improved light homogeneity. More preferably, the fiber output ends are configured as a "ring light" 124 (see also FIG. 3B): the fiber output ends are arrayed along a closed path—preferably a circular path—extending about a central passage 126, and are aligned to direct light from the light sources 102 to the sample area 10 (that is, the beams from the various fiber output ends intersect at a "focal spot" at which the sample 10 can be located). In this instance, as depicted in FIGS. 3A-3B, the camera 104 is preferably situated to image the sample area 10 through the central passage 126 defined between the fiber output ends of the output optical fiber bundle 114.

Figure 4:
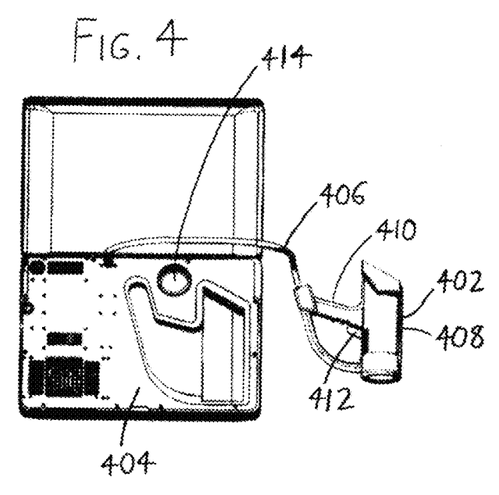
FIG. 4 is a view of an exemplary form in which the spectrometric device 100 of FIG. 1 might be provided, with a measurement head 402 flexibly tethered to a supply unit 404 via a cable 406.

For ease of use, the camera 104 and ring light 124 (or other sample illuminator) is preferably configured as a compact and easily manipulated measurement head allowing a user to easily situate it at locations where sample analysis is desired, while the remaining components can be provided in a supply unit which may be placed in a nearby out-of-the-way location. FIG. 4 shows an arrangement of this nature, wherein the camera 104 and ring light 124 of FIG. 1 are provided in a gun-like measurement head 402 connected to a supply unit 404 by an elongated flexible cable 406. The measurement head 402 has a muzzle 408 bearing the camera 104 and the illuminator 124 of FIG. 1, and a grip 410 bearing a trigger 412 which actuates spectroscopic imaging, with the measurement head 402 being flexibly tethered to the control system in the supply unit 404 by the cable 406 (which includes the output optical fiber bundle 114, power lines, etc. needed for operation of the measurement head 402). FIG. 1 illustrates how the FIG. 4 arrangement may be applied to the components of FIG. 1, with certain components being provided in the measurement head 402 and others being provided in the supply unit 404, with the cable depicted at 406.

Additional features can assist in enhancing data quality and ease of use. Initially, because the intensity of the light sources 102 and/or the sensitivity of the camera 104 (more particularly, its CCDs or other photosensitive detection elements) can change over time, it is useful to include calibration features in addition to, or instead of, the reference detector 122 noted above. Referring to FIGS. 3A-3B, a mask 300 may be mounted in fixed relationship to the camera 104 at the camera's focal plane, with the mask 300 being intended to rest atop the sample 10, and having an aperture 302 through which the camera 104 is to image at least a portion of the sample area 10. The mask 300 has a reference area 304 defined adjacent the aperture 302, whereby the camera 104 images at least a portion of the reference area 304 when capturing the image of the sample area 10. The reference area 304 has a known spectral response, and by imaging the reference area 304 while imaging the sample 10, the response of the reference area 304 can be used as a datum by which drift in the camera 104 (e.g., variation in the sensitivity of its CCDs or other imaging elements), and/or variation in the intensity of the light source(s) 102, can be detected by the control system (more particularly by its data processor 108) and corrected for. Further, the mask 300 is preferably mounted at the desired distance from the camera 104 by a rigid spacer tube 306, wherein the aperture 302 of the mask 300 (and its reference area 304) is imaged through the interior of the tube 306. The spacer tube 306 beneficially maintains the mask 300 at the proper distance from the camera 104, and also serves to prevent unwanted incident light from illuminating the sample area 10 while it is being imaged. The spacer tube 306 and mask 300 can beneficially be provided as components which can be attached to the measurement head 402 (FIG. 4) bearing the camera 104 and illuminator 124, and which can be removed and replaced when desired.

In the device 100 schematically illustrated in FIG. 1, the control system 106/108 for the device 100 is illustrated as having two parts: an illumination controller 106 configured to activate the light sources 102 to emit light (preferably by sequentially activating the light sources 102), and a data processor 108 configured to activate the camera 104 to capture two-dimensional images of the sample area 10 (at least at times when the light sources 102 are activated), and to process the captured images. To better avoid variations in illumination and imaging from image to image, the control system 106/108 preferably activates the light sources 102 and the camera 104 in synchrony with an AC line voltage powering the control system 106/108 (see FIG. 7).

Further versions, features, and advantages of the invention will be apparent from the remainder of this document in conjunction with the associated drawings.

DETAILED DESCRIPTION OF PREFERRED VERSIONS OF THE INVENTION

To review the exemplary spectrometric device 100 of FIG. 1 in greater detail, several light sources 102, such as LEDs or lasers, are connected to source optical fibers 112, which are in turn coupled to the sphere input ports 116 of the integrating sphere 110 by fiber couplers (e.g., simple SMA connectors or light collimators). The light sources 102 can have the same or different formats (e.g., B mount, C mount, TO-can, fiber coupled, and/or lens coupled lasers), and their wavelengths can be chosen as desired, preferably at wavelengths spaced at intervals across some range of interest (e.g., 200 nm to 25,000 nm). Often, the desired laser wavelengths are only available in different formats, making it necessary to use different types of light sources 102. If a light source 102 has an appropriate format, it could alternatively be directly optically coupled to a sphere input port 116, as with the light source 102A. In any event, the sphere input ports 116 are preferably placed symmetrically about, and equidistantly from, the sphere output port 118 so that their input light is directed onto a diffusely reflective surface of the integrating sphere 110, so that the input light from each source experiences substantially the same degree of internal reflection before reaching the sphere output port 118. The internal reflections within the integrating sphere 110 homogenize the light from the various light sources 102, rendering it more uniform in intensity and directionality by the time it reaches the sphere output port 118, and also serving to reduce or eliminate any laser speckle. Without the integrating sphere 110, it is difficult to couple several directed light sources 102, such as diode lasers, into an optical fiber bundle or other light transmitter and achieve uniform wide-angle illumination at the output end of the light transmitter.

The sphere gain (the efficiency of the integrating sphere 110) is reduced by the total area of the ports 116/118/120 on the sphere 110, as these reduce the available reflective surface. Thus, it is preferable to have the ports 116/118/120 occupy as little of the area of the sphere 110 as possible. To reduce the area occupied by the ports 116/118/120, it is useful to pre-combine the light from at least some of the light sources 102 using the fiber combiner 200 (FIG. 2), wherein the light from the various combiner input ends 202 is channeled to a single combiner output end 204 (e.g., a standard SMA 905 connector) optically coupled to one of the sphere input ports 116 (with the integrating sphere 110 preferably having only a single input port 116 in this instance). It has been found that use of a fiber combiner 200, and combining the output of as many light sources 102 as possible into as few sphere input ports 116 as possible, significantly helps with spectral data quality, likely because providing fewer input ports 116 on an integrating sphere 110 provides more interior sphere reflecting surface (thereby allowing more interior light reflection, enhancing the homogeneity of the light illuminating the sample 10), and also because light sources 102 illuminating the same sphere input port 116 will have greater similarity in the optical conditions that they encounter while traveling to the sample 10 (thereby reducing the effect of potential spatial differences in light intensity between different light sources 102). It is also possible to have one or more sphere input ports 116 each be supplied by multiple light sources 102 via respective fiber combiners 200, with one or more other sphere input ports 116 each being supplied by its own individual light source 102. (It is further possible to combine all light sources 102 using a fiber combiner 200, and then use the fiber combiner 200 as an output optical transmitter 114 for illuminating the sample 10 without the use of an integrating sphere 110, but as discussed above, the use of an integrating sphere 110 has been found to substantially improve the uniformity of the output light.)

As discussed above, apart from the sphere output port 118, the integrating sphere 110 may also include a secondary sphere output port—a sphere reference port 120—optically coupled to a reference detector 122. This is useful because semiconductor light sources 102 such as diode lasers are known to have pulse to pulse variations in light intensity, which limits measurement repeatability and spectrometric data quality. Some laser light sources 102 have built-in reference detectors to measure a signal proportional to the output of the laser, and this signal can be used for calibration and feedback purposes. However, as the number of light sources 102 used by the device 100 increases, it can become more difficult to compare the light output between the sources 102 because the intensity signals from the multiple reference detectors 122 can be difficult to fully normalize owing to their different characteristics: because the different reference detectors 122 may be of different detector materials, may be positioned differently relative to the solid-state light emitting components, may experience different temperatures when in use, etc., the different detectors 122 can behave differently from light source 102 to light source 102. Thus, it can be useful for the integrating sphere 110 to include the sphere reference port 120 and reference detector 122, enabling the device 100 to compare the actual light output from all light sources 102 after homogenization in the integrating sphere 110 (most preferably after encountering the same homogenization, where the light sources 102 all enter a single sphere input port 116 via the fiber combiner 200 of FIG. 2). The intensity signal from the detector 122 can be amplified, converted to a digital signal, or otherwise be processed before supplying it to the control system's data processor 108.

Figure 2:
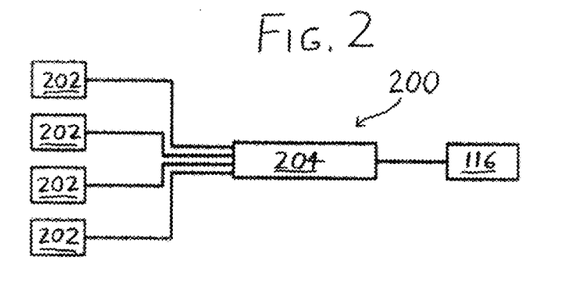
FIG. 2 is a schematic diagram of a fiber combiner 200 suitable for use in lieu of the multiple source optical fibers 112 of FIG. 1, for coupling into a single sphere input port 116 of the integrating sphere 110.

The light from the sphere output port 118 can then be used to illuminate the sample 10, preferably via an output optical transmitter 114 (an output optical fiber bundle or other light-transmitting element). The preferred approach is to have an output optical fiber bundle 114 wherein the many fibers within the bundle are randomized, and their fiber output ends are arranged to surround the central passage 126 (FIG. 3B) in the ring light 124 with their illumination directed at an angle towards the axis of the ring. The resulting light is diffuse, multi-directional, and uniform, particularly where the ring light 124 is supplied by both the integrating sphere 110 and fiber combiner 200 (FIG. 2). The sample 10 can then be situated at the location where the emitted light beams from the fiber output ends converge, where the uniformity and strength of the light is optimal for measurement.

During analysis, the best data quality results if the ring light 124 or other illuminator (fiber combiner output end, fiber bundle terminus, sphere output port, etc.), and the camera 104, are maintained at a steady (and optimal) focal distance from the surface of the sample 10. To this end, it is useful if the illuminator 124 and the camera 104 are mounted in fixed relation to each other as a unit, referred to herein as a measurement head (with an example shown at 402 in FIG. 4), and if a rigid spacer tube (306 in FIG. 3) is removably affixed forwardly of the illuminator 124 and camera 104 so that the light from the illuminator 124 is directed through, and the imaging of the camera 104 occurs through, the interior of the tube 306. (Throughout this document, it should be understood that a "removable" attachment is one that can be attached and detached by hand, or with the use of simple tools such as a pliers or screwdriver.) The length of the spacer tube 306 is sized such that situating its end against the sample 10 situates the sample 10 at the camera's focal plane, and also at the location at which the illuminator 124 provides optimal location (e.g., the location at which the beams from the ring light 124 converge). Thus, by situating the spacer tube 306 against and about the desired sample area 10, the spacer tube 306 automatically situates the sample area 10 at the proper location for analysis. Additionally, so long as the spacer tube 306 is tightly fit against the sample 10 and lacks locations for light entry, the sample area 10 will be isolated from ambient illumination that may interfere with accurate spectral imaging.

Figure 5:
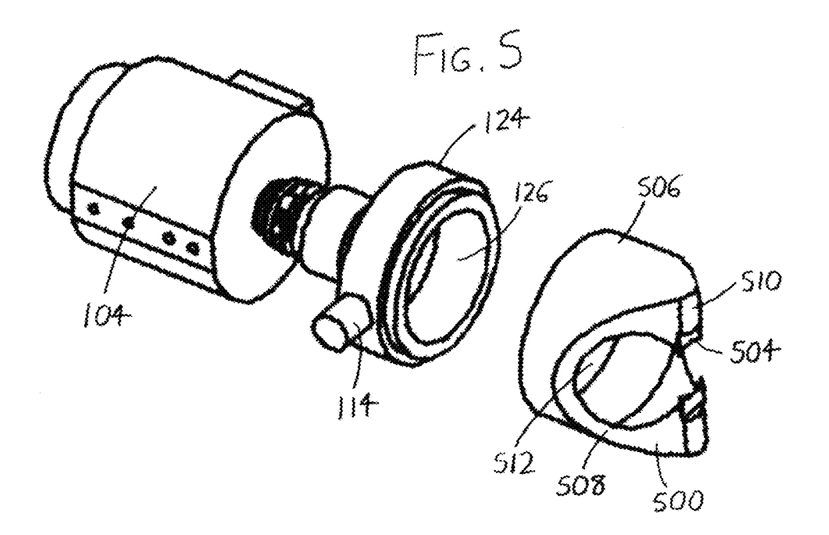
FIG. 5 is a perspective view of an exemplary spectrometric measurement head resembling that of FIGS. 3A-3B, but modified to have a spacer 506 resting forwardly of the camera 104 which better allows spectrometric analyses of materials situated along inside corner seams of structures.
Figure 6:
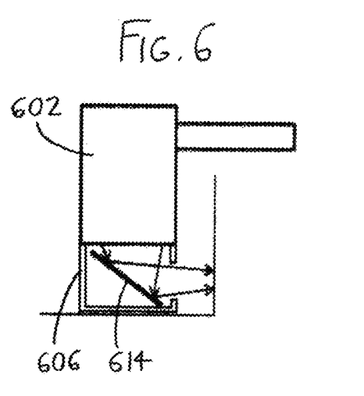
FIG. 6 is a schematic view of another exemplary spectrometric measurement head having a spacer 606 with an internal mirror 614 allowing imaging of surfaces situated at right angles to the camera's line of sight.

Referring again to FIGS. 3A-3B, a particularly preferred arrangement is to provide a mask 300 at the end of the spacer tube 306 wherein the mask 300 has an aperture 302 exposing the sample area 10 to the illuminator 124 and camera 104, with the aperture 302 being at least partially bounded by a reference area 304. Because the light sources 102 can have pulse-to-pulse variations in intensity, and because the imaging elements in the camera 104 can vary in sensitivity over time, image-to-image differences in spectral measurements can occur, interfering with data quality. By providing a reference area 304 with known spectral characteristics and illuminating and imaging a portion of it while also doing so to the sample area 10, the portion of the image from the reference area 304 can be used as a datum allowing for calibration of the image of the sample area 10. As an example, the reference area 304 may be situated at one or more locations about the aperture 302, and may be formed of a diffuse grey material which is at least substantially spectrally flat across the wavelengths of interest, so that it does not introduce new spectral artifacts to the measurement. Additionally, the reference area 304 is preferably thin and situated as close to the sample 10 as possible so it does not cast a shadow; is preferably diffuse and free of defects so that angular effects are minimized (e.g., tendency to preferentially reflect along certain angles); is preferably placed in such a way that the light reflected from the reference area 304 is representative of the amount of light which illuminates the sample area 10; is preferably consistently positioned between images so that the processing algorithms/software can easily identify the reference area 304 within the image; and preferably has a reflectivity similar in magnitude to that of the sample of interest. By including the reference area 304 within the image, the independently-varying output of the light sources 102 and the sensitivity of the camera 104 are characterized in one measurement, eliminating the need for the reference detector 122.

Where samples 10 with nonplanar surfaces are to regularly be analyzed, masks and/or spacers having shapes specially configured to closely fit against the nonplanar surface can be devised. As an example, FIG. 5 illustrates a measurement head (camera 104 and ring light illuminator 124) with a combined mask 500 and spacer 506—formed as a unit—which can be used to analyze interior corner seams. The tubular spacer 506 has a wedge-like form with opposing planar sides 508 which join at a curved vertex 510, from which the interior passage 512 of the spacer 506 extends. The mask 500, which is integrally formed with the end of the spacer 506 which is to abut the sample, has reference areas 504 which extend inwardly from opposing sides of the interior passage 512 at the vertex 510. FIG. 6 then illustrates a measurement head 602 with a tubular spacer 606 configured to allow imaging of a wall adjacent to a corner, with the spacer 606 having an interior mirror 614 which directs illumination from, and passes an image of the wall to, the measurement head 602.

To further review the operation of the device of FIG. 1, the data processor 108 coordinates imaging along with the illumination controller 106 via a digital signal line 128. When illumination from a light source 102 is needed, the illumination controller 106 turns on a current driver 130 for the desired duration (and at the desired current, and thus the desired intensity), and instructs a multiplexer 132 to select the desired light source 102. Where the light sources 102 are laser diodes, the use of the integrating sphere 110, and the output optical fiber bundle 114 and ring light 124, provides uniform high-quality illumination of the sample 10, particularly where the light sources 102 are coupled into the integrating sphere 110 using the fiber combiner 200 (FIG. 2). When the trigger 412 (FIG. 4) is pressed by a user, the camera 104 is activated via camera control line 134 to image the sample 10 when it is being illuminated by the selected light source 102. The camera 104 images the sample 10 through a hyperspectral lens 136, which is preferably free of distortion and chromatic error across the range of wavelengths used by the light sources 102. The image is transmitted through a camera signal line 138 to a data port 140 on the data processor 108; depending on the make and model of camera 104 used, the data port 140 may be a Camera Link, USB, Gigabit Ethernet, or other connection.

As discussed below in greater detail, the light sources 102 are multiplexed in succession, so that an image is acquired at the wavelength of each light source 102, allowing the data processor 108 to construct a multispectral image over time. A "dark" reference image of the sample 10 is also acquired with all of the light sources 102 turned off, to provide a calibration image which can be used to characterize any ambient broadband light falling on the sample 10 and reflected back to the camera 104. The reference area 304 (FIG. 3B) included in each image is used to capture the relative illumination intensities of each of the wavelengths for each image. The multispectral image—i.e., the foregoing images—is processed to create an image of the sample 10 illustrating the locations of the sample's physical/chemical features. With suitably fast components and switching, a complete multispectral image can be constructed in under a second.

Other components of the device include a power supply 142 connected via power lines 144 to the illumination controller 106, current driver 130, camera 104, and data processor 108 (and its accompanying input and output devices, e.g., an input device 146—such as the trigger 412 of FIG. 4—for activating illumination and imaging, and a touchscreen 148 for display of results and adjustment of settings). Regarding the control system (the illumination controller 106 and data processor 108), these can be provided as separate components or as a unit within the measurement head 402 and/or in the supply unit 404, and can be provided as a special-purpose computer (e.g., an ASIC), a general-purpose computer (e.g., a conventional personal computer, microcontroller, or the like), combinations of these devices, and/or in other forms having equivalent functionality.

A preferred version of the device resembled that of FIG. 4, with a 9-foot cable 406 joining the measurement head 402 to the supply unit 404. The light sources 102 were laser diodes emitting in the 1000-1700 nm near-infrared region, and all optical fibers were glass or low-OH glass-type fibers, which efficiently transmit light in this wavelength region with minimal optical absorption. A fiber combiner 200 (FIG. 2) received the output from the light sources 102 and supplied it to the sole input port 116 of the integrating sphere 110 via an SMA connector. The integrating sphere 110 had a 1.5 inch diameter, and was internally coated with diffuse gold (LaserGold™ by Epner Technologies, Brooklyn, N.Y.). No sphere reference port 120 or reference detector 122 was used, and a reference area 304 (FIG. 3) on the measurement head 402 was used instead. Additionally, a reference station 414 of known composition was included on the supply unit 404, whereby the device's functionality could be checked by placing the measurement head 402 against the reference station 414 and imaging it to see whether the expected results were returned.

Figure 7:
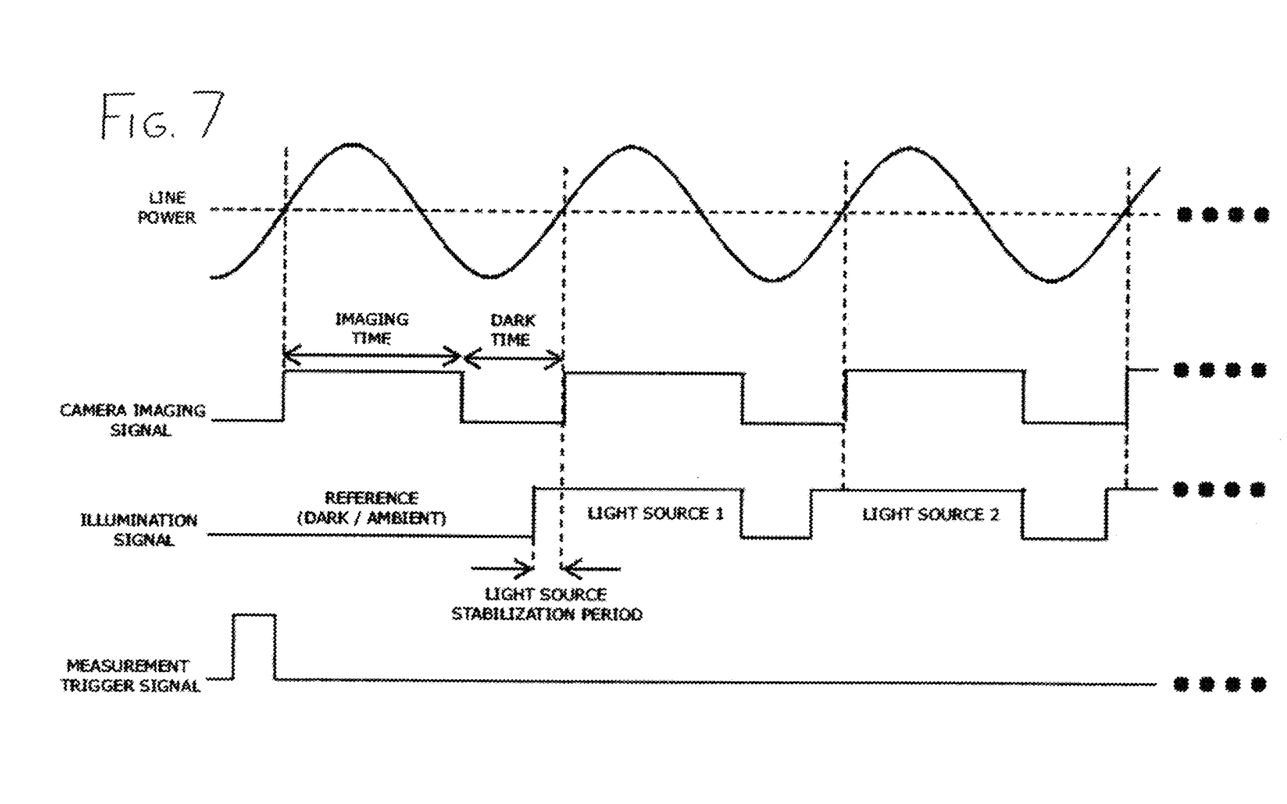
FIG. 7 is a chart showing exemplary timing for illumination and imaging operations in the spectrometric device 100 of FIG. 1.

To review the illumination and imaging timing in greater detail, FIG. 7 shows a timing diagram. Measurement is initiated by the illumination controller using a measurement trigger signal shown at the bottom of FIG. 7, which might be generated by the user pushing the trigger 412 on the measurement head 402 of FIG. 4. The trigger signal initiates a sequence of measurement periods wherein all light sources 102 are turned off in the first period to record a reference image of the dark signal (or, in the case where ambient light is present, to record that light level), to be used later for correction (e.g., subtraction of the background signal). In each measurement period, the camera 104 is triggered to image for a predetermined imaging time, and is turned off for the rest of the measurement period. The light sources 102 are each turned on in succession, with each one being illuminated in its own measuring period, and with the light sources 102 each being turned on for a stabilization period before the camera 104 is triggered to allow the light source output to stabilize before imaging occurs. After the stabilization period, each light source 102 is kept on for the duration of the camera imaging time. Once the camera 104 has captured images using all light sources 102, the device may either stop and await another trigger signal, or it may repeat the cycle shown in FIG. 7 one or more times, and then average the images from each light source 102 (and also average the reference image) before performing further analyses of the measurement.

During measurement, it is important that the camera exposure—and thus the image—is not influenced by ambient light. Assuming ambient light changes slowly over time, the foregoing scheme is effective, as the dark/ambient reference image characterizes the ambient light level on the sample 10. However, where ambient light changes rapidly—for example, where measurements are being taken of a sample 10 under conventional fluorescent lights operating at standard 50-60 hz line voltage—it's useful to compensate for the effect of such background variation. Assuming the measurement scheme of FIG. 7 is used, the camera imaging is always initiated at the same time during the line voltage cycle. This approach assures that the same amount of external light is included in the dark/ambient reference image as with the images taken using each light source 102. After recording all images, the following formula may be used to generate the corrected signal for each pixel in the images:

$$I_{i,j,k} = -\log\{(S_{i,j,k} - D_{i,j})/(R_{i,j,k} - D_{i,j})\}$$

Where $I_{i,j,k}$ is the corrected absorbance signal at pixel i,j of the image for light source k; S is the sample measurement; R is the light level recorded on the reference area, and D is the dark measurement, with all light sources 102 turned off. Once the corrected signals are calculated for all pixels in all images, a hyperspectral image can be represented by appropriately weighting the intensity at each wavelength:

$$Y_{i,j} = B_0 + B_1 * I_{i,j,1} + B_2 * I_{i,j,2} B_3 * I_{i,j,3} + \ldots$$

$Y_{i,j}$ can then be displayed for all points in the image, or can be saved or otherwise used.

To illustrate a potential use of the invention, the device 100 was used to analyze the moisture content of fresh lettuce leaves. Test spectra taken from fresh lettuce leaves, and from those that lost moisture from drying, show a peak around 1450 nm which is indicative of the moisture content of the leaves. The test spectra were taken at one-hour time intervals while air was blown over the leaves to dry them, with full 1000-2500 nm spectra being recorded using a push-broom hyperspectral SWIR camera (SWIR-LVDS-100-N25E by Specim Ltd, Oulu, Finland).

Figure 8A:
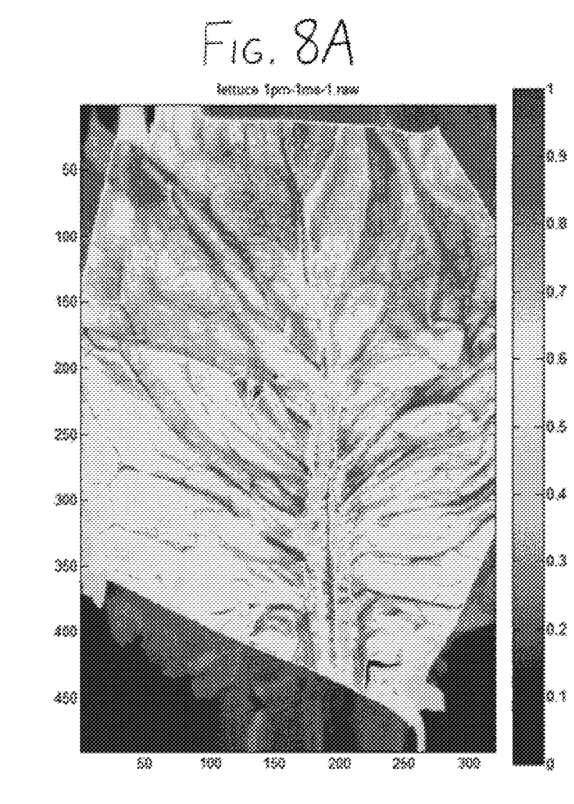
FIGS. 8A and 8B are hyperspectral images of the moisture content of a fresh lettuce leaf (FIG. 8A), and of the leaf after several hours of drying (FIG. 8B).
Figure 8B:
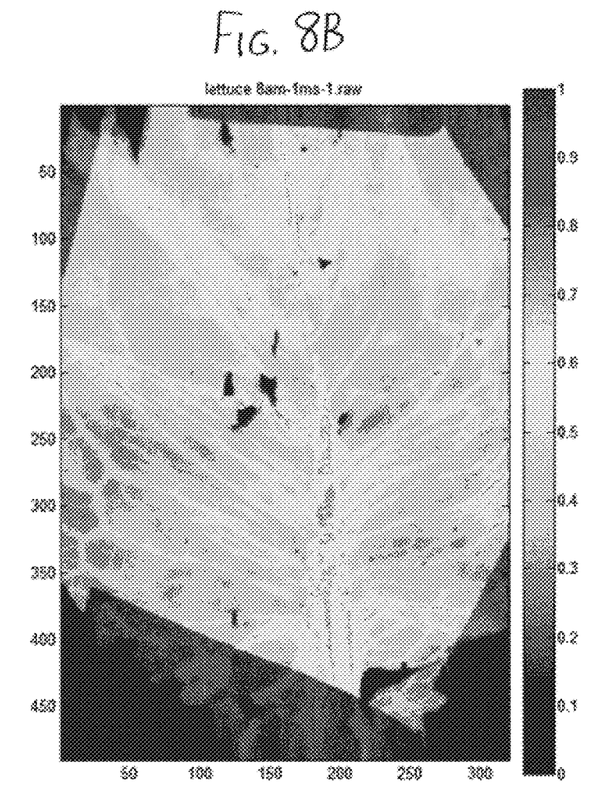

The leaves were then analyzed by a device 100 having three lasers 102, one having a wavelength near the moisture peak, and the others having wavelengths at valleys above and below the moisture peak. Using the 1450 nm analytical wavelength and two baseline indicator wavelengths at 1350 and 1550 nm, the image of the moisture content and its distribution can be calculated as follows:

$$M(\%) = B_0 + B_1(I_{1450} - \tfrac{1}{2}(I_{1350} + I_{1550})) \text{ or } M(\%) = B_0 + B_1 * I_{1450} + B_2 * I_{1350} + B_3 * I_{1550}$$

Where the optical intensity, $I_n$, is the absorbance at wavelength n. FIG. 8 shows an exemplary image of the moisture distribution in a fresh (high moisture) leaf (A) and one after drying (B). (Because the original image was in color, and presented areas of higher moisture with darker red and areas of lesser moisture with darker blue—with these darker colors both presenting as darker grey in the accompanying FIG. 8—interpretation of FIG. 8 is not as easy as for the original full-color image.) The device 100 would be useful for measurement of the moisture content of not only plants, but for any other materials where moisture content is of interest.

To illustrate another potential use of the invention, a device 100 as described above was constructed for determination of resin thickness on the surface of a carbon fiber-resin composite. Resin pockets—that is, resin pooling—on the surface of 3D woven composites is an indicator of wrinkles in the composite material. Wrinkles may affect the structural integrity of the composite part, but without a good method for detecting such wrinkles, it is difficult to study those effects. The existing non-destructive techniques for characterizing resin pockets (e.g., ultrasound methods) are not sensitive enough to identify shallow pools (less than 60 mils). The constructed device 100, used in the near-infrared range, was able to measure surface resin features on composites with much higher sensitivity than prior non-destructive technologies.

Figure 9:
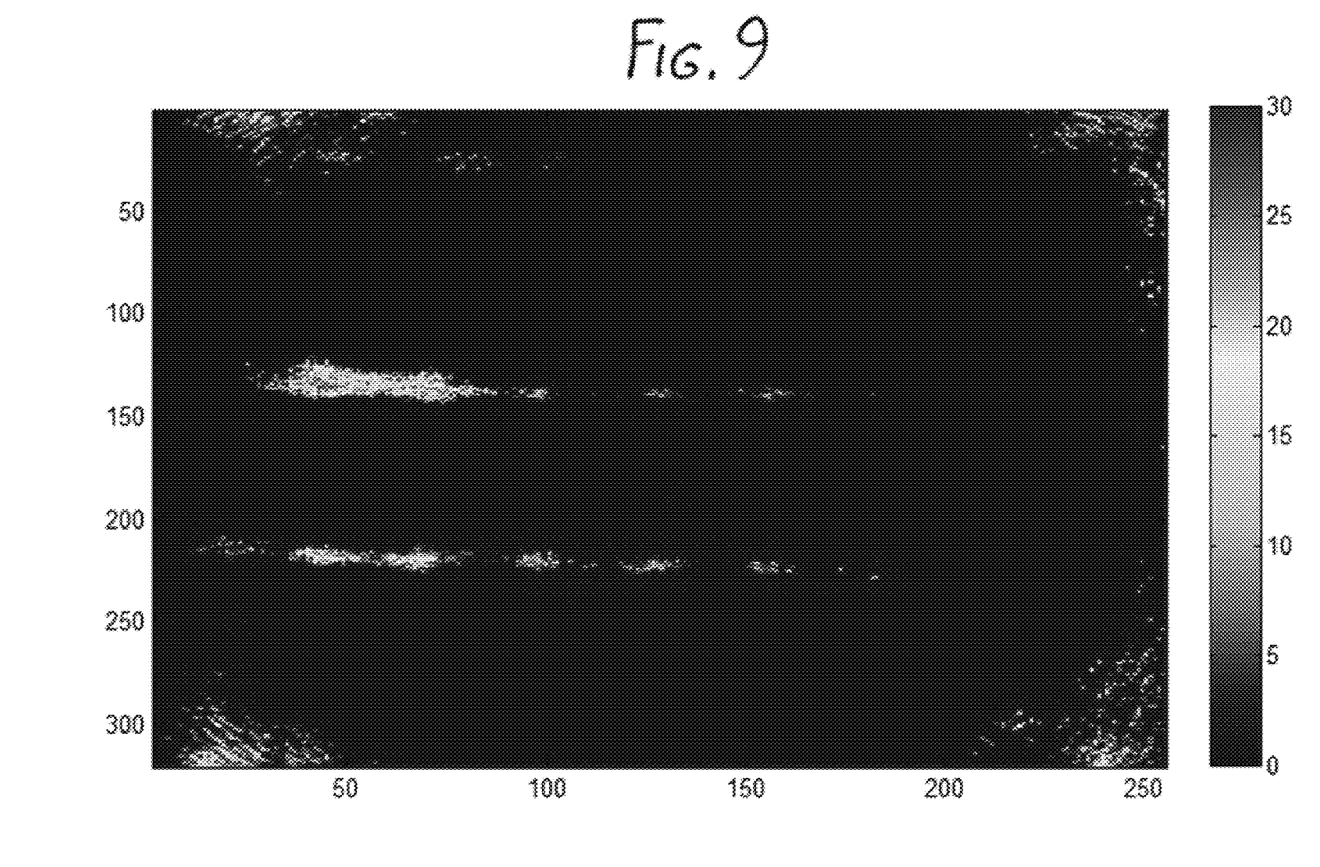
FIG. 9 is a chart showing the thickness of thermosetting resin across a portion of the surface of a carbon fiber-resin composite.

When near-infrared spectra of different resin thicknesses are obtained, the different spectra display the same peaks, but the peaks grow more exaggerated as resin thickness (and thus absorbance) increases. By selecting wavelengths that correspond (at least roughly) to these peaks, and using a set of standard calibration samples with known resin thicknesses, a calibration equation was developed for the device 100 whereby the images taken at the different wavelengths were converted into thickness maps. The thickness of a surface resin feature of an unknown sample could then be measured by placing the hand-portable measuring head 402 (FIG. 4) on the part of the sample to be analyzed, and pressing the trigger 412 on the handle 410. The device 100 produced a thickness map of the resin thickness on a 320×256 pixel LCD screen provided on the measurement head 402. Images obtained with all lasers off, and with each laser on, were processed by use of the calibration equation to generate the thickness map shown in FIG. 9. Beyond the thickness map, the data processor of the device 100 was able to provide cross-section graphs, width and depth of resin features, and various measurement statistics.

While the device 100 has been described as operating in the near-infrared wavelength range (typically 1000-2500 nm), generally the same components and methods apply to operation in the ultraviolet (200-400 nm), visible (400-800 nm), VNIR (400-1000 nm), and mid-infrared (2500-25000 nm) regions as well.

When constructing a device as described above, performance is enhanced if consideration is given to the materials which the device is intended to analyze, and if the wavelengths (and number of wavelengths) chosen are appropriate for the materials. It is useful to compile a sample calibration set consisting of perhaps 2-100 different samples representing all the variations that are expected to be encountered, with material concentrations ranging between the expected extremes (e.g., in the case of moisture determination, the driest and wettest samples that are expected to be encountered). The samples can then be analyzed using conventional UV-visible, near-infrared, mid-infrared, spectral, or hyperspectral devices. Conventional statistical and chemometric practices, such as Principal Component Analysis, Partial Least Squares, Science-Based Calibration, or Multivariate Curve Resolution, can then be used to determine the component spectra (i.e., the materials present in the samples). These spectra can then in turn be used to help select the optimal wavelengths to be chosen for the device, with the candidate wavelengths being chosen from those for which light sources 102 are available from different manufacturers.

Two exemplary methods that can be used to select the optimal wavelengths, and thus the light sources 102 for use in the device 100, are forward selection and backward elimination. In forward selection, the first wavelength selected from the list of all available light source wavelengths is the one with the strongest correlation with the analyte of greatest interest, or the strongest correlation with a physical feature of interest (such as layer thickness). Fixing this first wavelength, the second best wavelength is selected, the calibration calculations are repeated, the statistical parameters for this new set is established and this procedure is repeated to add new wavelengths. The criteria for selection could be based on the standard error of calibration (SEC) or if there are sufficient number of samples, the standard error of prediction (SEP).

In backward elimination, all available wavelengths are used to establish the correlation between the spectra and the analyte. The wavelength with the weakest contribution to the correlation is eliminated, and the correlation is recalculated. This process is continued until the correlation gets significantly weaker, or when the SEP falls below the desired level.

Regardless of the method chosen, choice of wavelengths (and thus light sources 102) will also require economic and engineering considerations, e.g., cost of the candidate light sources 102, their ease of installation, calibration, and use, and their mechanical, cooling and electrical requirements.

It should be understood that the versions of the invention described above are merely exemplary, and the invention is not intended to be limited to these versions. Rather, the scope of rights to the invention is limited only by the claims set out below, and the invention encompasses all different versions that fall literally or equivalently within the scope of these claims.

What is claimed is:

1. A spectrometric device for analyzing the composition of a sample, the device including:
   a. two or more monochromatic light sources, wherein light from each light source is directed to a sample area,
   b. a fiber combiner extending between two or more combiner input ends and a combiner output end, wherein each light source is optically coupled to one of the combiner input ends,
   c. an integrating sphere having a sphere input port and a sphere output port, wherein the combiner output end is optically coupled to the sphere input port,
   d. a camera configured to capture a two-dimensional image of the sample area, and
   e. a control system configured to:
      (1) sequentially activate the light sources to emit light, and
      (2) activate the camera to capture images when the light sources are activated.

2. A spectrometric device for analyzing the composition of a sample, the device including:
   a. two or more monochromatic light sources, wherein light from each light source is directed to a sample area,
   b. optical fibers, each of the optical fibers having a fiber input end and a fiber output end, wherein:
      (1) the fiber input ends receive light from the light sources, and
      (2) the fiber output ends are:
         (a) arrayed in a closed path extending about a central passage, and
         (b) aligned to direct light from the light sources to the sample area,
   c. a mask:
      (1) mounted in fixed relationship with the fiber output ends,
      (2) having an aperture defined therein, wherein the aperture defines at least a portion of the sample area, and
      (3) having a reference area defined adjacent the aperture,
   d. a camera configured to capture a two-dimensional image of the sample area, wherein the camera:
      (1) is situated to capture the image of the sample area through the central passage, and
      (2) images at least a portion of the reference area when capturing the image of the sample area,
   e. a measurement head defining a housing maintaining the camera and the output ends of the optical fibers as a unit,
   f. a rigid spacer tube:
      (1) removably attached to the measurement head, and
      (2) having a tube length situated between the mask and the fiber output ends, whereby the spacer tube spaces the fiber output ends from the sample area,
   g. a control system configured to:
      (1) sequentially activate the light sources to emit light, and
      (2) activate the camera to capture images when the light sources are activated.

3. The spectrometric device of claim 1 further including a rigid spacer tube having a tube length situated between the sample area and the fiber output ends, whereby the spacer tube spaces the fiber output ends from the sample area.

4. The spectrometric device of claim 1 further including:
   a. optical fibers, each of the optical fibers having a fiber input end and a fiber output end, wherein:
      (1) the fiber input ends receive light from the light sources, and
      (2) the fiber output ends are:
         (a) arrayed in a closed path extending about a central passage, and
         (b) aligned to direct light from the light sources to the sample area,
   b. a mask:
      (1) mounted in fixed relationship with the fiber output ends,
      (2) having an aperture defined therein, wherein the aperture defines at least a portion of the sample area, and
      (3) having a reference area defined adjacent the aperture,
   c. wherein the camera images at least a portion of the reference area when capturing the image of the sample area.

5. The spectrometric device of claim 4 further including:
   a. a measurement head defining a housing maintaining the camera and the output ends of the optical fibers as a unit,
   b. a rigid spacer tube:
      (1) removably attached to the measurement head, and
      (2) having a tube length situated between the mask and the fiber output ends, whereby the spacer tube spaces the fiber output ends from the sample area.

6. The spectrometric device of claim 2 further including a measurement head:
   a. configured as a gun having a grip and a muzzle, wherein the muzzle includes the camera and the fiber output ends therein,
   b. flexibly tethered to the control system by the optical fibers.

7. The spectrometric device of claim 2:
   a. further including an integrating sphere having one or more sphere input ports and a sphere output port, and
   b. wherein:
      (1) each light source is optically coupled to one of the sphere input ports, wherein light from the light source is directed into the integrating sphere, and
      (2) light from the light sources is emitted from the sphere output port.

8. The spectrometric device of claim 1 wherein the integrating sphere further includes:
   a. a sphere reference port, and
   b. a detector optically coupled to the sphere reference port, the detector being configured to measure the intensity of light exiting the sphere reference port.

9. The spectrometric device of claim 2:
   a. further including:
      (1) a fiber combiner extending between two or more combiner input ends and a combiner output end,
      (2) an integrating sphere having a sphere input port and a sphere output port,
   b. wherein:
      (1) each light source is optically coupled to one of the combiner input ends, and
      (2) the combiner output end is optically coupled to the sphere input port.

10. The spectrometric device of claim 1:
    a. further including optical fibers, each of the optical fibers having a fiber input end and a fiber output end, wherein:

(1) the fiber input ends are optically coupled to the sphere output port, and
  (2) the fiber output ends are:
    (a) arrayed in a closed path extending about a central passage, and
    (b) aligned to direct light from the light sources to the sample area,
  b. wherein the camera is situated to capture the image of the sample area through the central passage.

11. The spectrometric device of claim 10:
  a. further including a mask:
    (1) situated a fixed distance from the fiber output ends,
    (2) having an aperture defined therein, wherein the aperture defines at least a portion of the sample area, and
    (3) having a reference area defined adjacent the aperture,
  b. wherein the camera images at least a portion of the reference area when capturing the image of the sample area.

12. The spectrometric device of claim 11 further including a rigid spacer ring removably situated between the fiber output ends and the mask.

13. The spectrometric device of claim 1 wherein the control system is further configured to:
  a. activate the light sources to emit light, and
  b. activate the camera to capture images,
  in synchrony with an AC line voltage powering the control system.

14. The spectrometric device of claim 1 wherein the light sources include one or more diode lasers.

15. A spectrometric device for analyzing the composition of a sample, the device including:
  a. two or more monochromatic light sources;
  b. an integrating sphere having:
    (1) an input port receiving light from one or more of the light sources,
    (2) a sphere output port emitting integrated light from the integrating sphere,
  c. a fiber combiner extending between:
    (1) two or more combiner input ends, wherein each light source is optically coupled to one of the combiner input ends,
    (2) a combiner output end optically coupled to the sphere input port,
  d. optical fibers, each having:
    (1) an input end optically coupled to the sphere output port, and
    (2) an output end aligned to direct light from the integrating sphere to a sample area,
  e. a camera configured to capture a two-dimensional image of the sample area when the light sources are activated.

16. The spectrometric device of claim 15 wherein:
  a. the fiber output ends are arrayed in a closed path extending about a central passage, and
  b. the camera is situated to capture the image of the sample area through the central passage.

17. The spectrometric device of claim 15:
  a. further including a mask:
    (1) mounted in fixed relationship with the fiber output ends,
    (2) having an aperture defined therein, wherein the aperture defines at least a portion of the sample area, and
    (3) having a reference area defined adjacent the aperture,
  b. wherein the camera images at least a portion of the reference area when capturing the image of the sample area.

18. The spectrometric device of claim 17 further including:
  a. a measurement head defining a housing maintaining the camera and the output ends of the optical fibers as a unit,
  b. a rigid spacer tube:
    (1) removably attached to the measurement head, and
    (2) having a tube length situated between the mask and the fiber output ends, whereby the spacer tube spaces the fiber output ends from the sample area.

19. The spectrometric device of claim 17 further including a rigid spacer ring removably situated between the fiber output ends and the mask.

20. The spectrometric device of claim 15 further including a measurement head:
  a. configured as a gun having a grip and a muzzle, wherein the muzzle includes the camera and the fiber output ends therein,
  b. flexibly tethered to the control system by the optical fibers.

* * * * *